United States Patent
Planeta et al.

(10) Patent No.: US 8,293,062 B2
(45) Date of Patent: Oct. 23, 2012

(54) SHRINK FILM WITH INDIVIDUAL LAYER IRRADIATION

(75) Inventors: Mirek Planeta, Mississauga (CA); Harinder Tamber, Mississauga (CA); Felix Guberman, Mississauga (CA)

(73) Assignee: Macro Engineering and Technology, Inc., Mississauga (CA)

( * ) Notice: Subject to any disclaimer, the term of this patent is extended or adjusted under 35 U.S.C. 154(b) by 1048 days.

(21) Appl. No.: 12/112,349

(22) Filed: Apr. 30, 2008

(65) Prior Publication Data

US 2008/0283185 A1    Nov. 20, 2008

Related U.S. Application Data

(60) Provisional application No. 60/924,488, filed on May 17, 2007.

(51) Int. Cl.
    *B32B 37/00*    (2006.01)

(52) U.S. Cl. .................................... 156/275.5
(58) Field of Classification Search .............. 156/272.2, 156/273.3, 275.5
    See application file for complete search history.

(56) References Cited

U.S. PATENT DOCUMENTS

| | | | | |
|---|---|---|---|---|
| 3,530,084 | A * | 9/1970 | Potts | 524/563 |
| 4,044,187 | A | 8/1977 | Kremkau | |
| 4,064,296 | A * | 12/1977 | Bornstein et al. | 428/34.9 |
| 4,784,863 | A * | 11/1988 | Lustig et al. | 426/113 |
| 5,053,259 | A * | 10/1991 | Vicik | 428/36.91 |
| 5,993,922 | A * | 11/1999 | Babrowicz et al. | 428/35.7 |
| 6,218,024 | B1 * | 4/2001 | Tamber et al. | 428/520 |

* cited by examiner

*Primary Examiner* — Daniel McNally
(74) *Attorney, Agent, or Firm* — Steven M. Greenberg, Esq.; Carey Rodriguez Greenberg & O'Keefe, LLP

(57) ABSTRACT

A method of producing a multilayer plastic film from resin starting material includes irradiating a batch of plastic resin material and using irradiated resin from the batch to produce at least one layer of a multilayer plastic film.

11 Claims, 3 Drawing Sheets

SHRINK FILM WITH INDIVIDUAL LAYER IRRADIATION

RELATED APPLICATIONS

This application claims priority from U.S. Provisional Application No. 60/ 924488 filed May 17, 2007.

FIELD OF INVENTION

This invention relates to multilayer plastic film.

BACKGROUND OF THE INVENTION

Multilayer plastic films are used for many purposes, for example in the food packaging industry. Such films are described for example in U.S. Pat. No. 6,159,616 (Planeta et al) issued Dec. 12, 2000 and U.S. Pat. No. 6,218,024 (Tamber et al) issued Apr. 17, 2001, the contents of which are hereby incorporated herein by reference.

It is known to irradiate such multi-layer films to improve their properties, for example mechanical properties such as puncture resistance, tensile strength and abuse resistance. However, the problem with irradiating a multi-layer film is that the radiation which improves the properties of one or more layers may adversely affect the properties of another layer or layers. It has been proposed to irradiate a layer before it is bonded with other layers to produce a multi-layer film, but this technique has presented production difficulties.

SUMMARY OF THE INVENTION

According to the invention, at least one layer of a multilayer plastic film is formed from a plastic resin, i.e. the starting material, which has been irradiated before it is formed into a layer. The invention thus enables the resin or resins from which a layer or layers are subsequently formed to be irradiated to an extent which optimizes the properties of the layer or layers concerned.

BRIEF DESCRIPTION OF THE DRAWINGS

Embodiments of the invention will flow be described, by way of example, with reference to the accompanying drawings, of which.

DETAILED DESCRIPTION OF PREFERRED EMBODIMENTS

Figure 1:
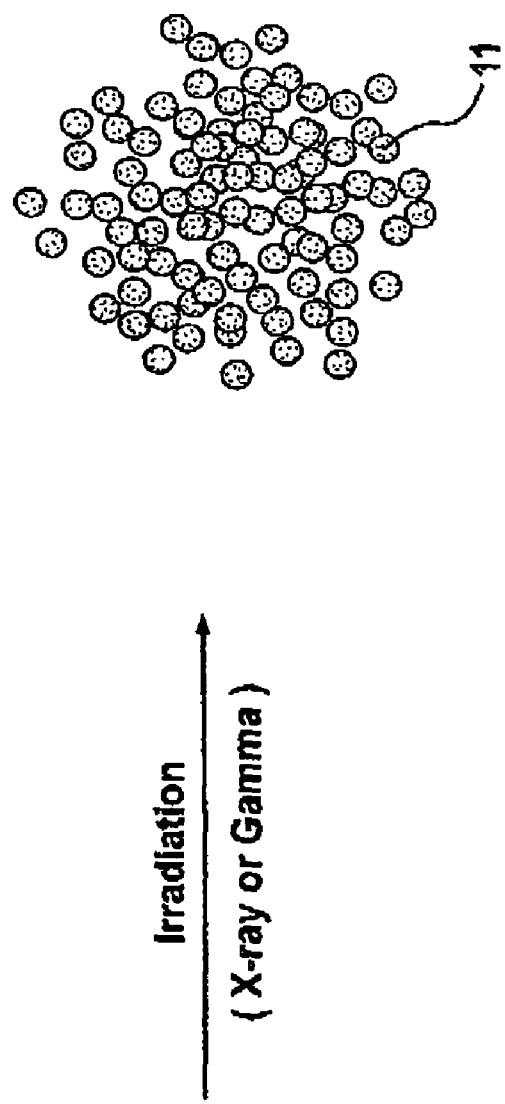
FIG. 1 is a schematic view showing irradiation of plastic resin pellets which will be formed into a layer of a multilayer plastic film.
Figure 1:
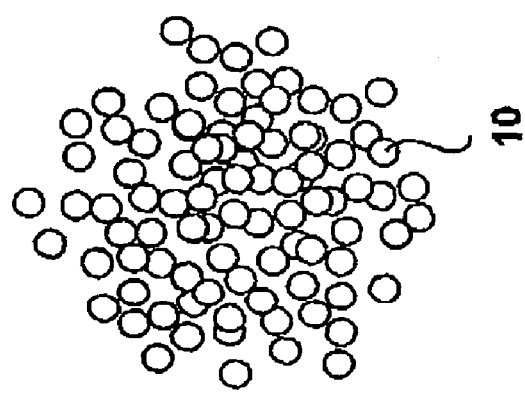

Referring to the drawings, FIG. 1 shows plastic resin pellets 10 being irradiated to produce irradiated plastic pellets 11 prior to being formed into a layer of a multilayer plastic film. Depending on the composition of the plastic resin pellets, the pellets are irradiated with radiation of at least 2MR by means of x-rays or gamma rays.

Figure 2:
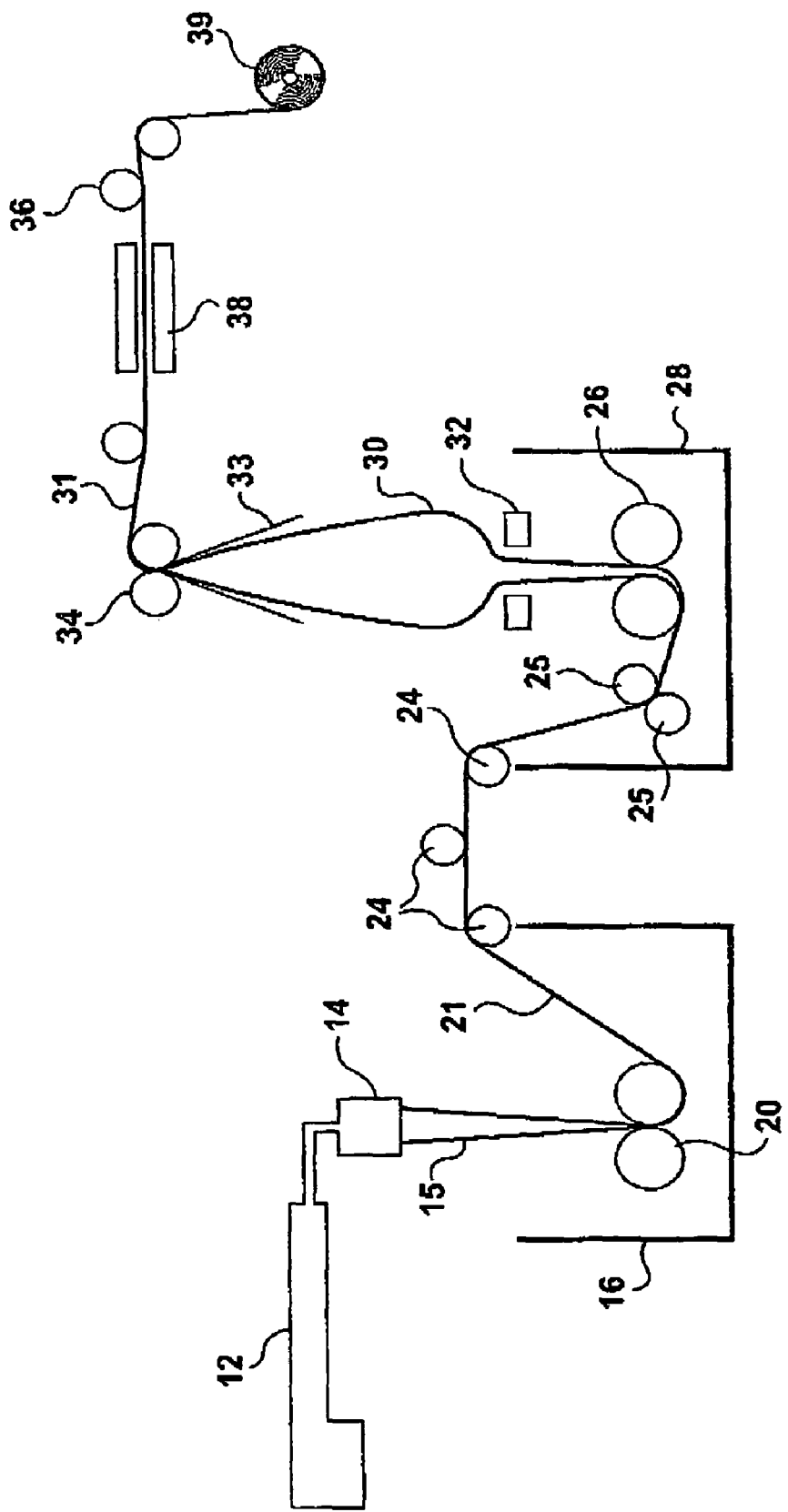
FIG. 2 is a schematic view showing a method of production of a multilayer plastic film by means of a double bubble process.

A multilayer plastic film in accordance with the invention may be produced by a process including the known double bubble method. Referring to FIG. 2, a multilayer plastic film is produced by using an appropriate number of extruders 12 (only one of which is shown). At least one extruder 12 is supplied with plastic resin which has been irradiated in accordance with the invention. The resins from extruders 12 are fed to an annular die 14 and a multilayer tubular films is extruded downwardly therefrom in bubble form. The films is cooled in a cold water tank 16 located under the die 14 and containing water at a temperature of about 25° C. or lower. The bubble formed by the multilayer films is terminated by nip rollers 20 in the cold water tank 16 which collapse the films from bubble to flat form. The cold water in tank 16 quenches the films to maintain the amorphous state of the plastic material and to lower the temperature thereof to facilitate subsequent biaxial orientation at a later stage in the process.

The collapsed and quenched film 21 from the cold water tank 16 is passed over idler rollers 24 and then fed into a hot water tank 28 where the film 21 passes through nip rollers 25, 26 and then upwardly through an air ring 32 beyond which the film is blown to form a second bubble 30, which is subsequently collapsed by a collapsing frame 33. The collapsed film passes through nip rollers 34 at a speed which is from about 3 to about 5 times the speed with which the film passes through nip rollers 26, with the air in the bubble 30 being trapped therein by the rollers 26, 34. This results in biaxial orientation of the film lengthwise and breadth wise. The collapsed film 31 then passes an optional annealing station 38 which stabilizes the film to prevent subsequent shrinkage when in a roll. The film 31 then passes over further idler rollers 36 and is then wound into a roll 39. Examples of a multilayer plastic film made in accordance with the present invention will now be described.

Figure 3:
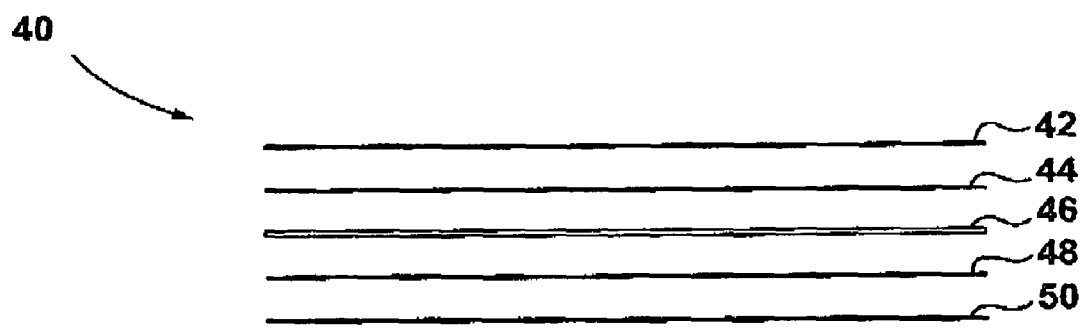
FIG. 3 is a schematic view of a five layer film of which at least one layer was produced from a plastic resin which had previously been irradiated in the manner shown in FIG. 1

Referring first to FIG. 3, a five layer film 40 is made in accordance with the method described with reference to FIGS. 1 and 2. The film 40 comprises an outer layer 42, a bonding layer 44, a PVDC layer 46, a further bonding layer 48 and a second outer layer in the form of a sealant layer 50.

The central layer 46, namely the third layer, is a PVDC barrier layer with a thickness in the range of from about 2 to about 15 microns and comprising a co-polymer of vinylitine chloride and methyl acrylate. The PVDC layer 46 provides good oxygen and moisture barrier properties as well as oil resisting properties. Neither the PVDC layer 46 nor the starting material therefor was subjected to irradiation.

The PVDC layer 46 is bonded by a bonding layer 44 to an outside layer 42 which comprises low density polyethylene to provide abuse resistance during handling and transportation, cold resistance and heat resistance to around 90-98° C. which is required for cook-in uses. The resin used to produce the outside layer 42 was subjected to irradiation in the manner indicated in FIG. 1 in the range from about 2 to about 20MR, preferably from about 2 to about 10MR, and still more preferably from about 2 to about 6MR. The outer layer 42 may have a thickness in the range from about 10 about 40 microns, preferably from about 20 to about 40 microns.

The outer layer 50, namely the sealant layer, may have a thickness in the range of about 10 to about 40 microns, preferably from about 10 to about 30 microns and comprises low density polyethylene. The sealant layer 50 provides heat sealing ability, good seal strength in the presence of fats or oils, seal strength for cook-in uses and during shelf life of the film, and puncture resistance for bone-in-meat usage. The resin used to produce the sealant layer 50 was irradiated to a level in the range of from about 2 to about 20MR, preferably from about 2 to about 10MR, and more preferably from about 2 to about 6MR.

The bonding layers 44, 48 may comprise ethylene vinyl-acetate copolymer, with each layer having a thickness in the range from about 3 to about 10 microns. The resin from which the bonding layers 44, 48 is produced is irradiated at a level in the range from about 2 to about 10MR, preferably from about 2 to about 6MR and more preferably from about 2 to about 4MR.

Figure 4:
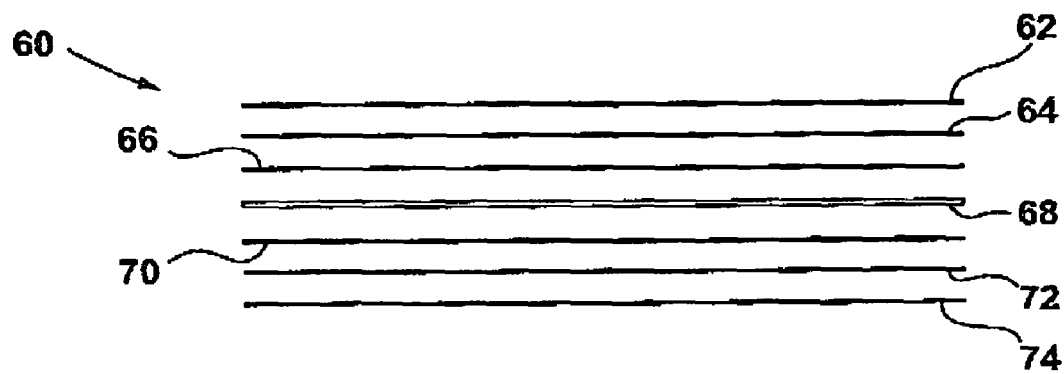
FIG. 4 is a similar view of a seven layer film.

FIG. 4 shows a seven layer film 60 which is similar to the five layer film described with reference to FIG. 3, except that a shrink layer 64 is provided between sealant layer 62 and bonding layer 66, and a further shrink layer 70 is provided between bonding layer 70 and sealant (outer) layer 74, with the central layer 68 being a PVDC barrier layer as before.

The shrink layers 64, 72 may each have a thickness in the range of from about 5 to 20 microns, with the resin from which these layers are formed being irradiated in the range from about 2 to about 6MR, preferably about 2MR.

Both films 40 and 60 can be produced with good physical and mechanical properties, with the film 60 having a total thickness of about 60 microns and the film 70 having a total thickness of about 65 microns.

The advantages and other embodiments of the invention will now be readily apparent to a person skilled in the art from the foregoing description, the scope of the invention being defined in the appended claims.

What is claimed is:

1. A method for producing a multilayer plastic film from resin starting material including:
   irradiating a first batch of plastic resin material at a first radiation dose and using irradiated resin from said first batch to produce at least a first layer of the multilayer plastic film;
   irradiating a second batch of plastic resin material at a second radiation dose and using irradiated resin from said second batch to produce at least a second layer of the multilayer plastic film;
   wherein the first radiation dose is different from the second radiation dose; and using a batch of non-irradiated plastic resin to produce at least a third layer of the multilayer plastic film.

2. A method according to claim 1 wherein said at least a third layer comprises a PVDC layer.

3. The method of claim 2, wherein:
   irradiated resin from said first batch is used to produce two outer layers;
   irradiated resin from said second batch is used to produce two bonding layers; and
   the non-irradiated resin is used to produce a barrier layer; with the bonding layers disposed between the barrier layer and the outer layers.

4. The method of claim 3, wherein:
   said first batch of plastic resin material is irradiated at about in the range from about 2 to about 20MR; and
   said second batch of plastic resin is irradiated at about in the range from about 2 to about 10 MR.

5. The method of claim 2, further comprising:
   irradiating a third batch of plastic resin material at a third radiation dose;
   the third radiation dose being different from both the first radiation dose and the second radiation dose;
   wherein:
   irradiated resin from said first batch is used to produce two outer layers;
   irradiated resin from said second batch is used to produce two bonding layers;
   irradiated resin from said third batch is used to produce two shrink layers;
   and
   the non-irradiated resin is used to produce a barrier layer; and wherein:
   the shrink layers are disposed between the bonding layers and the outer layers; and
   the barrier layer is disposed between the bonding layers so as to be a central layer.

6. The method of claim 5, wherein:
   said first batch of plastic resin material is irradiated at about in the range from about 2 to about 20 MR; and
   said second batch of plastic resin is irradiated at about in the range from about 2 to about 10MR; and
   said third batch of plastic resin is irradiated at about in the range from about 2 to about 6 MR.

7. The method of claim 1, wherein:
   irradiated resin from said first batch is used to produce two outer layers;
   irradiated resin from said second batch is used to produce two bonding layers; and
   the non-irradiated resin is used to produce a barrier layer; with the bonding layers disposed between the barrier layer and the outer layers.

8. The method of claim 7, wherein:
   said first batch of plastic resin material is irradiated at about in the range from about 2 to about 20 MR; and
   said second batch of plastic resin is irradiated at about in the range from about 2 to about 10 MR.

9. The method of claim 1, further comprising:
   irradiating a third batch of plastic resin material at a third radiation dose;
   the third radiation dose being different from both the first radiation dose and the second radiation dose;
   wherein:
   irradiated resin from said first batch is used to produce two outer layers;
   irradiated resin from said second batch is used to produce two bonding layers;
   irradiated resin from said third batch is used to produce two shrink layers; and
   the non-irradiated resin is used to produce a barrier layer; and wherein:
   the shrink layers are disposed between the bonding layers and the outer layers; and
   the barrier layer is disposed between the bonding layers so as to be a central layer.

10. The method of claim 9, wherein:
    said first batch of plastic resin material is irradiated at about in the range from about 2 to about 20 MR; and
    said second batch of plastic resin is irradiated at about in the range from about 2 to about 10MR; and
    said third batch of plastic resin is irradiated at about in the range from about 2 to about 6 MR.

11. A method according to claim 1 wherein:
    said first batch of plastic resin material is irradiated at about in the range from about 2 to about 20 MR; and
    said second batch of plastic resin is irradiated at about in the range from about 2 to about 10 MR.

* * * * *